United States Patent [19]

Newlon

[11] 4,241,810
[45] Dec. 30, 1980

[54] DEVICE FOR ABSORBING MECHANICAL SHOCK

[75] Inventor: Charles E. Newlon, Knoxville, Tenn.

[73] Assignee: The United States of America as represented by the United States Department of Energy, Washington, D.C.

[21] Appl. No.: 70,546

[22] Filed: Aug. 29, 1979

[51] Int. Cl.³ ............................................. F16D 63/00
[52] U.S. Cl. ................................... 188/1 C; 206/521; 206/592; 248/548; 410/49
[58] Field of Search ...................... 267/182, 141, 153; 410/36, 42, 47, 49; 293/133; 213/1 A; 248/346 R, 548, 356, 636; 206/521, 587, 591, 592; 188/1 C, 32, 266, 1 B

[56] References Cited

U.S. PATENT DOCUMENTS

| | | |
|---|---|---|
| 2,732,040 | 1/1956 | DeVost . |
| 2,851,235 | 9/1958 | Henig ................................ 410/49 X |
| 3,078,971 | 2/1963 | Wallerstein, Jr. ............... 188/1 B X |
| 3,362,666 | 1/1968 | O'Donnell ....................... 267/153 X |
| 3,829,148 | 8/1974 | Stoneburner ......................... 410/49 |
| 3,908,951 | 9/1975 | Goben . |
| 4,029,178 | 6/1977 | Tschift . |
| 4,058,188 | 11/1977 | Urillon . |
| 4,138,093 | 2/1979 | Meinzer . |

Primary Examiner—George E. A. Halvosa
Attorney, Agent, or Firm—James E. Denny; Stephen D. Hamel; Fred O. Lewis

[57] ABSTRACT

This invention is a comparatively inexpensive but efficient shock-absorbing device having special application to the protection of shipping and storage cylinders. In a typical application, two of the devices are strapped to a cylinder to serve as saddle-type supports for the cylinder during storage and to protect the cylinder in the event it is dropped during lifting or lowering operations.

In its preferred form, the invention includes a hardwood plank whose grain runs in the longitudinal direction. The basal portion of the plank is of solid cross-section, whereas the upper face of the plank is cut away to form a concave surface fittable against the sidewall of a storage cylinder. The concave surface is divided into a series of segments by transversely extending, throughgoing relief slots. A layer of elastomeric material is positioned on the concave face, the elastomer being extrudable into slots when pressed against the segments by a preselected pressure characteristic of a high-energy impact. The compressive, tensile, and shear properties of the hardwood and the elastomer are utilized in combination to provide a surprisingly high energy-absorption capability.

11 Claims, 2 Drawing Figures

DEVICE FOR ABSORBING MECHANICAL SHOCK

BACKGROUND OF THE INVENTION

1. Field of the Invention

This invention relates generally to devices for absorbing high-energy mechanical shock and more particularly to low-cost impact-attenuation devices for protecting storage cylinders and the like. The invention is the result of a contract with the U.S. Department of Energy.

2. Prior Art

U.S. Pat. No. 2,732,040 (to V. De Vost et al.; Mar. 23, 1953) describes a shock-absorbing device in the form of a yieldable container packed with a dense particulate medium. U.S. Pat. No. 3,908,951 (to K. V. Goben; Sept. 30, 1975) discloses an akimbo-shaped metal structure which under a given load deforms plastically to absorb energy. U.S. Pat. No. 4,029,178 (to Tschift; June 14, 1977) describes a high-impact damper comprising a metal plate-and-bar assembly. U.S. Pat. No. 4,058,188 (to Vrillon; Nov. 15, 1977) discloses a shock absorber comprising an annular body provided with circular holes disposed in a special pattern. U.S. Pat. No. 4,138,093 (to Meinzer; Feb. 6, 1979) describes an impact-absorbing cell comprising a metallic container for a damping material defining a conical void. None of the foregoing is believed to disclose or suggest applicant's invention as claimed.

Large storage cylinders often are supported in the horizontal position by means of two or more wooden saddles deployed on a concrete pad or the like. The typical saddle comprises a solid plank having a concave upper face which is contoured to mate with the exterior of the cylinder. Such saddles have been used extensively to support metal cylinders, each containing thousands of pounds of toxic uranium hexafluoride ($UF_6$). However, simulated accidents have shown that such cylinders sometimes rupture if dropped onto a conventional all-wood saddle from a height of only one foot.

3. Objects of the Invention

Accordingly, it is an object of this invention to provide a novel shock-absorbing device.

It is another object to provide a relatively lightweight, efficient shock-absorbing device for use with conventional shipping or storage cylinders.

It is another object to provide an expendable shock-absorbing device characterized by simple design and a low fabrication cost.

Other objects, advantages, and features of the invention will be made evident hereinafter.

SUMMARY OF THE INVENTION

A shock-absorbing device designed in accordance with this invention comprises a wooden member having a base, the basal portion of the member being formed with a solid cross-section. A top portion opposed to the base is formed of spaced-apart segments whose upper faces cooperatively define a concave surface. An elastomeric sheet is disposed on the concave surface, the sheet being extrudable into the spaces between the segments when forced against the concave surface by a pressure exceeding a preselected value. In one embodiment of the invention, the wooden member is of elongated configuration, and the concave surface is contoured to mate with a cylindrical surface extending transversely of the member.

DESCRIPTION OF THE PREFERRED EMBODIMENTS

This invention can be used to protect equipment of various configurations, but for brevity it will be illustrated herein as used to protect conventional metal cylinders used for storing or transporting materials.

Figure 2:
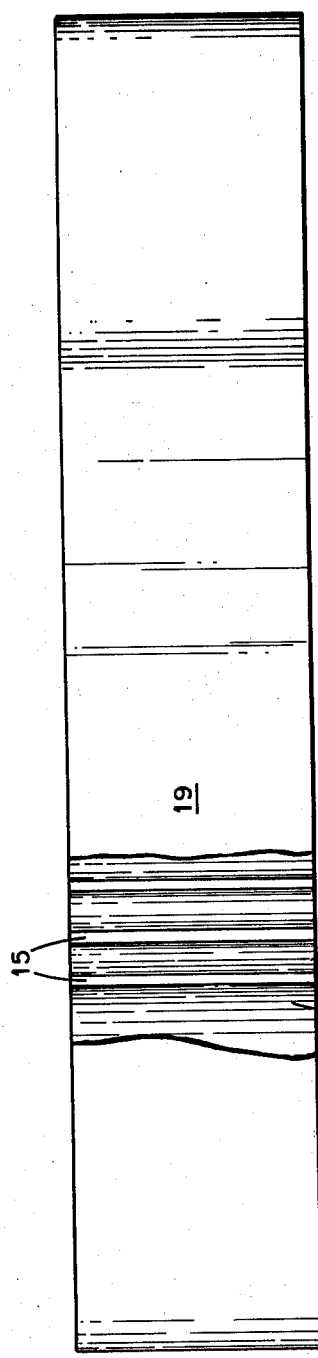
FIG. 2 is a top view of the same.
The drawings are not to scale.
Figure 1:
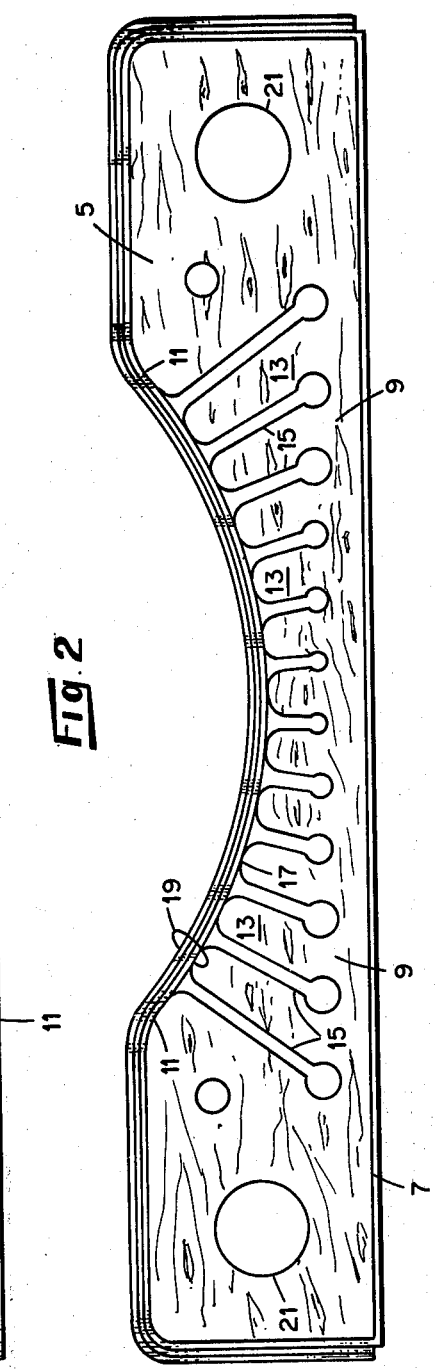
FIG. 1 is a side view of a shock-absorbing device designed in accordance with this invention.

Referring to FIGS. 1 and 2, a preferred embodiment of the invention comprises a hardwood (e.g., oak) plank 5 having a base 7. The basal portion 9 of the plank is formed throughout with a solid cross-section. A central upper portion of the plank is cut away to form a concave surface 11, which in profile defines a longitudinally extending circle-arc; the curvature of the arc corresponds to that of the sidewall of the cylinder to be protected from shock. As shown, the surface 11 is divided into segments 13 by throughgoing, transversely extending, keyhole-shaped relief slots 15. The upper faces 17 of the segments may be described as cooperatively defining a concave surface fittable against a cylindrical surface extending transversely of the plank. Preferably, the faces 17 are chamfered as shown, to form flared entrances for the slots. As shown, the upper, or entrance, ends of the slots are equally spaced, and the slots lie in planes which intersect the axis of generation for the concave surface 11. The slots are arrayed in two series which extend in opposite directions from the centerline of the plank. In each series the slots increase in length from the innermost outward. A longitudinally extending line connecting the bottoms of the slots near the center of the array approximates an upwardly convex arc. Holes 21 are provided in the end sections of the plank for the passage of mounting straps or the like.

As shown, a relatively thick strip 19 of rubber or other elastomer is positioned on the upper face of the plank 5 and superimposed on at least the segmented position thereof. Preferably, the elastomer is a synthetic rubber having a hardness such that it will be extruded into the slots 15 if forced against the segments by a pressure characterized by high-energy impacts. For example, the strip 19 may have a hardness in the range of from about 40 to 65, as determined with a standard durometer.

EXAMPLE

Shock absorbers designed as shown in the drawings were fabricated and tested. Referring to the typical absorber, the plank 5 was composed of white oak and had the following dimensions: 4'6"×9"×7" wide. The grain of the wood ran perpendicular to the direction of the load to be applied. The upper portion of the plank was cut away as shown to form a concave surface for mating with the sidewall of a 48"- diameter cylinder. The concave portion was slotted as shown, the typical slot being designed with its narrow portion having a width of ½". The shortest (central) slots had a length of 2½"; the longest, 6¾". The spacing between the ends of the longest slots and the base of the plank was about 1⅛". The elastomeric strip was formed of three plies of solid neoprene (commercial-grade neoprene, manufactured by E. I. DuPont, Inc.). The hardness of the rubber was 50, as measured under standard conditions with a durometer. The three-ply layer had a thickness of ⅜". The rubber was not fastened to the plank. As shown in FIG. 1, the plies extended over the top and ends of the plank, and the innermost ply also extended about the base. The cost of materials for the absorber was less than $50. This particular embodiment of the invention weighed 83 pounds.

Two of the above-described shock absorbers were strapped to the underside of a standard metal cylinder (diameter, 48"; length, 121") designed to hold 20,000 pounds of $UF_6$. The cylinder was designed with three stiffening rings. Because the junctions of the rings and cylinder were considered particularly vulnerable areas, each shock absorber was mounted to extend alongside the inside face of an end stiffening ring. In the normal storage position—i.e., with the shock absorber/cylinder assembly resting on a concrete pad—the shock absorbers provided about a two-inch spacing between the rims of the stiffening rings and the pad. For test purposes, the cylinder was loaded with water to 95% of its volume and then pressurized with nitrogen to simulate the vapor pressure of $UF_6$. The total weight of the loaded cylinder was 8853 pounds.

The test comprised dropping the loaded-cylinder/shock absorber assembly onto a reinforced concrete pad from heights of 10, 20 and 30 feet. To maximize secondary impact, the assembly was dropped with the axis of the cylinder at 35° to the horizontal. None of the drop tests resulted in rupture of the cylinder; in fact, the only damage to the cylinder comprised relatively small dents. The stiffening rings were not damaged. The shock absorbers used in each test were damaged to the extent they could not be re-used; the typical damage comprised many broken segments, and in some cases the basal section of the plank was broken. It was calculated that the typical chock would withstand up to 31,000 foot-pounds before failure. Tests conducted with a standard compression-load machine indicated that a load of about 40,000 to 50,000 pounds was required to initiate extrusion of the strip 19 into the relief slots 15. Other tests showed that the shock absorber would support a static load of 90,000 pounds without damage to the plank or permanent set to the elastomeric layer.

By utilizing the compressive, tensile, and shear properties of wood and elastomer in combination, the invention achieves efficient energy absorption. Under pressure, the elastomer is forced into the volume-relief slots 15. At high pressures, the rubber reaches its elastic limit and tears, and the plank reaches its ultimate strength and is demolished. The breakage of the plank is due primarily to the stresses produced by the elastomer extruded into the slots. That is, the slots provide a fulcrum for the bending moments imposed by the extruded elastomer. For high-energy-absorption applications, it is important that the grain of the plank extend longitudinally.

In the illustrated embodiment, the elastomeric layer is not fastened to the plank. If desired, however, it may be affixed in any suitable manner, as by gluing or by fastening with countersunk screws. It is not essential that the layer extend over the ends or bottom of the plank. Preferably, the slots 15 are of keyhole shape, but this is not critical. For example, in some applications the expanded end sections are not required. Better usage of the friction and shear properties of the materials is obtained if the elastomer consists of plies, but this is not essential.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. A device for absorbing mechanical shock, comprising:
    a wooden member comprising a basal portion and an opposed top portion, the basal portion being formed of solid cross-section, and the top portion being formed of spaced-apart segments formed between openings in the top portion whose upper faces cooperatively define a concave surface, and
    an elastomeric strip superimposed on said concave surface and extrudable into the openings between said segments when forced against the segments by a pressure above a preselected value to effect deformation of said segments to a point capable of breakage thereof.

2. The device of claim 1 wherein said concave surface is fittable against a cylindrical surface extending transversely to said member.

3. The device of claim 1 wherein said member is of elongated configuration and the grain of said member extends longitudinally.

4. The device of claim 1 wherein said member is composed of a hardwood.

5. The device of claim 1 wherein said strip has a durometer hardness in the range of from about 40 to 65.

6. A device for absorbing mechanical shock, comprising:
    an elongated wooden member having a basal portion and an opposed top portion, said basal portion being of solid cross-section and said top portion being divided into segments by transversely extending slots, the upper faces of said segments cooperatively defining a concave surface fittable against a cylindrical surface extending transversely of said member, and
    an elastomeric sheet superimposed on said surface and extrudable into said slots when forced against said concave surface by a pressure exceeding a preselected value to effect deformation of said segments to a point capable of breakage thereof.

7. The device of claim 6 wherein said member is composed of a hardwood.

8. The device of claim 6 wherein said slots are formed with circularly expanded lower ends.

9. The device of claim 6 wherein said sheet has a durometer hardness in the range of from about 40 to 65.

10. The device of claim 6 wherein said slots lie in equally spaced planes intersecting the axis of generation for said concave surface.

11. A device for absorbing mechanical shock, comprising:
    an elongated wood member having a basal portion and an opposed top portion; the grain of said member extending in the longitudinal direction, said basal portion being of solid cross-section and said top portion being divided into segments by transversely extending slots, the upper faces of said segments defining a concave surface fittable against a cylindrical surface extending transversely of said member, and an elastomeric sheet superimposed on said surface and extrudable into said slots when forced against said concave surface by a pressure exceeding a preselected value to effect deformation of said segments to a point capable of breakage thereof, said sheet having a durometer hardness in the range of from about 40 to 65.

* * * * *